United States Patent

Sterzel et al.

Patent Number: 5,976,454
Date of Patent: Nov. 2, 1999

[54] PROCESS FOR PRODUCING OPEN-CELLED, INORGANIC SINTERED FOAM PRODUCTS

[75] Inventors: Hans-Josef Sterzel, Dannstadt-Schauernheim; Michael Hesse, Worms; Andreas Kleinke, Ludwigshafen, all of Germany

[73] Assignee: BASF Aktiengesellschaft, Ludwigshafen, Germany

[21] Appl. No.: 08/819,998

[22] Filed: Mar. 18, 1997

[30] Foreign Application Priority Data

Apr. 1, 1996 [DE] Germany .................. 196 12 985
Aug. 23, 1996 [DE] Germany .................. 196 34 205

[51] Int. Cl.⁶ .................................. B29C 65/00
[52] U.S. Cl. .................. 419/2; 264/43; 264/431; 264/432
[58] Field of Search .................. 264/43, 430, 431, 264/432, 433; 419/2

[56] References Cited

U.S. PATENT DOCUMENTS

| | | | |
|---|---|---|---|
| 4,318,995 | 3/1982 | Rhodes et al. | 501/1 |
| 4,697,632 | 10/1987 | Lirones | 164/369 |
| 4,863,712 | 9/1989 | Twigg et al. | 423/651 |
| 4,871,495 | 10/1989 | Helferich et al. | 264/43 |
| 4,912,076 | 3/1990 | Mizrah et al. | 502/300 |
| 5,061,660 | 10/1991 | Park et al. | 501/80 |
| 5,066,432 | 11/1991 | Gabathuler et al. | 264/28 |
| 5,217,939 | 6/1993 | Campbell | 502/339 |
| 5,242,882 | 9/1993 | Campbell | 502/325 |
| 5,256,387 | 10/1993 | Campbell | 423/392 |
| 5,336,656 | 8/1994 | Campbell | 502/329 |

FOREIGN PATENT DOCUMENTS

| | | |
|---|---|---|
| 157 974 | 10/1985 | European Pat. Off. . |
| 261 070 | 3/1988 | European Pat. Off. . |
| 341 203 | 4/1989 | European Pat. Off. . |
| 330 963 | 9/1989 | European Pat. Off. . |
| 445 067 | 1/1991 | European Pat. Off. . |
| 412 673 | 2/1991 | European Pat. Off. . |
| 440 322 | 8/1991 | European Pat. Off. . |
| 801 142 | 12/1950 | Germany . |
| 846 525 | 8/1952 | Germany . |
| 904 272 | 2/1954 | Germany . |
| 3510170 | 3/1985 | Germany . |
| 3731888 | 9/1987 | Germany . |
| 3732654 | 9/1987 | Germany . |
| 38 16 893 | 5/1988 | Germany . |
| 3835807 | 10/1988 | Germany . |
| 3934496 | 10/1989 | Germany . |
| 60-221371 | 11/1985 | Japan . |
| 61-295283 | 12/1986 | Japan . |
| 2290211 | 4/1989 | Japan . |
| 88/07403 | 10/1988 | WIPO . |
| 95/11752 | 5/1995 | WIPO . |

OTHER PUBLICATIONS

Chem. Abst., vol. 115, No. 18, Nov. 4, 1991, AN 188465a.

Primary Examiner—Christopher A. Fiorilla
Attorney, Agent, or Firm—Keil & Weinkauf

[57] ABSTRACT

A process for producing open-celled, inorganic sintered foam products which comprises:

a. converting slip material comprising sinterable inorganic powder, a fluid, vaporizable material which makes this slip material capable of flow and, if desired, a material forming blowing gas into a foamed product in a foaming step with liberation of the blowing gas, b. subjecting this foamed product to a treatment which essentially makes the slip material incapable of flow and forms an open-pored intermediate body, with the steps a. and b. being able to proceed essentially simultaneously, c. removing material remaining from the fluid material and any further material from the intermediate body to form a green foam body, and d. sintering the green foam body to form the open-celled, inorganic sintered foam product.

10 Claims, 2 Drawing Sheets

PROCESS FOR PRODUCING OPEN-CELLED, INORGANIC SINTERED FOAM PRODUCTS

BACKGROUND OF THE INVENTION

The present invention relates to both ceramic and metallic open-cell foams for a wide range of applications, and processes, in particular continuous processes, for their preparation.

Inorganic foams are known per se. They are prepared by a wide range of processes with so far insurmountable disadvantages and therefore costs which are so high that said processes are used only in special cases. By far the most widely claimed process comprises infiltrating open-cell polymer foams with a slip which contains inorganic particles. The infiltrated polymer foam, generally a polyurethane foam, is carefully dried, the organic components are removed by slow controlled heating and the negative consisting of inorganic powder is sintered. This itself is the reason for the complicated, expensive preparation. Both the drying of the pore structure filled with slip and the removal of the organic components by pyrolysis are very time-consuming. In addition, the material thicknesses are limited to a few centimeters owing to the slow drying and pyrolysis. The preparation of such foams is described, for example, in DE-A 39,34,496 or EP-A 157,974. EP-A 440,322 describes the complicated technology for the preparation of open-cell ceramic foams by means of an arrangement of rollers for infiltration and compression of the infiltrated polymer foams.

A wide range of applications have been described for inorganic foams, owing to their high-temperature stability and resistance to media. Thus, DE-A 37,32,654, U.S. Pat. No. 5,336,656, U.S. Pat. No. 5,256,387, U.S. Pat. No. 5,242,882 and U.S. Pat. No. 5,217,939 claim ceramic foams as carriers for catalysts, for example for stack gas treatment. With their random arrangement of webs, ceramic foams give substantially better mass transfer than extruded honeycomb elements which may have no webs in the flow direction owing to the extrusion technology, the pressure loss very advantageously being small. This applies in particular when the pore volume is more than 50%, more advantageously more than 70%, of the total volume of the catalyst carrier and the webs have thicknesses of less than 1 mm. Small pressure losses are particularly important in the application as carriers in stack gas treatment (DE-A 35,10,170), in vehicle exhaust gas catalysts (DE-A 37,31,888) or in the application as diesel exhaust gas filters (EP-A 312,501). Frequently, ceramic foams are also claimed as filters for the purification of very hot melts, such as metal melts (U.S. Pat. No. 4,697,632) or for the filtration of hot gases (EP-A 412,931).

All these applications make use of the preparation of open-cell foams by the infiltration of open-cell polymer foams. The inorganic materials claimed are just as varied as the applications. For foams having low thermal expansion, the material used is lithium aluminum silicate or cordierite. Such foams have particularly high resistance to large, abrupt temperature changes, as must be possessed by a catalytic converter for motor vehicle exhaust gases (JP-A 6,1295, 283). On the other hand, inert behavior to metal melts is important for filtering metal melts. Here, α-alumina, silicon carbide and $SiO_2$ and in particular mixtures thereof are used (EP-A 412,673). Foams of silicon carbide are particularly suitable for the filtration of iron melts or melts of iron-containing alloys (WO 88/07403). Silicon nitride, too, is claimed as filter material of ceramic open-cell foams (DE-A 38,35,807). EP-A 445,067 describes $Y_2O_3$ stabilized zirconium oxide or $ZrO_2/Al_2O_3$ mixed ceramics as filters for molten metals.

In addition to the infiltration of polymer foams with inorganic slips, followed by drying, pyrolysis and sintering, other methods for the preparation of inorganic foams have also been disclosed:

WO 95/11752 describes a process in which metals are chemically deposited on an open-cell polymer foam and, after drying and pyrolysis, an open-cell metal foam which can be converted into a ceramic foam by oxidation is obtained. Here too, drying and pyrolysis are very complicated. Drying and pyrolysis are avoided by the process which is claimed in EP-A 261,070 and starts from a metal foam, preferably from aluminum foam, for the preparation of ceramic foams and in which the latter is then oxidized to the metal oxide. A disadvantage of this process is that a metal foam has to be prepared beforehand in some manner. A process for the preparation of metal foams (Fraunhofer-Institut für Angewandte Materialforschung, Bremen) starts from an aluminum powder, with which titanium hydride powder is mixed. The powder mixture is heated in a mold to just above the melting point of aluminum, the titanium hydride decomposing and the resulting hydrogen expanding the molten aluminum. In this case, which is not generally applicable, the melting point of the aluminum and the decomposition temperature range of the titanium hydride are compatible with one another.

In other known processes, too, hydrogen is used as a blowing agent for the preparation of inorganic foams: thus, it is known that strongly alkaline alkali metal silicates or alkali metal aluminates can be mixed with a powder of a non-noble metal, preferably aluminum, the metal dissolving and hydrogen being evolved as a gaseous blowing agent. After the foams have been dried, they have to be treated with ammonium compounds in order to remove disadvantageous alkali metal ions. After sintering, such foams contain less than 0.5% of alkali metal ions (EP-A 344,284, DE-A 38,16, 893).

A dry process for the preparation of ceramic foams comprises mixing ceramic powders with volcanic eruption products which, when heated to 900–1400° C., expand the resulting melt with gas evolution (JP-A 6,0221,371). Foams prepared in this manner are used in particular as heat-insulating (closed-cell) building material.

JP-A 2/290211 describes a process for the preparation of ceramic filters for metal melts, in which resin particles of various sizes, preferably of foamed polystyrene, are bonded to one another and the voids are infiltrated with a ceramic slip. After drying at 500–600° C., the organic components are removed by pyrolysis and the foam is then sintered in air at 1200–1800° C.

Open channels in ceramic foams can also be produced by applying short organic fibers, such as cotton, polyamide fibers or acrylic fibers, or inorganic fibers, such as graphite fibers, to an adhesive surface, applying further fibers with an organic binder, infiltrating the laid fiber web with inorganic slip, drying, pyrolyzing and sintering (EP-A 341,203). Foams having a pore volume of less than 35% are said to be produced in this manner. They are used as filters for molten metals.

Finally, it is also known that ceramic foams can be produced by adding aqueous polymer dispersions to aqueous ceramic slips, beating the mixture like cream, until it has from 1.5 to 10 times the initial volume, to give a foam, running the foam into a mold, drying, removing the organic assistants by pyrolysis and then sintering (EP-A 330,963). The amount by weight of organic material is 65–95% and the amount by weight of dispersion (dry matter) is 5–50%, which has to be removed by pyrolysis. What is disadvantageous for the applications of such open-cell inorganic foams is that relatively large air bubbles, too, are beaten in and that a large part of the foam cells are closed. Air is occluded during beating, and the resulting cells are stabilized by the polymer dispersion and only some of them break open during drying.

Problems arise in attempts to fill the reactive components of polyurethane foams to a high degree with inorganic powders and, by their reaction with one another, directly to produce an open-cell polyurethane foam which has a high filler content and from which the organic components can be removed by pyrolysis owing to the open-cell character. The molar mass of the components at the beginning of foaming is in fact so low that the foaming mixture is not sufficiently elastic, with the result that the small foam bubbles burst too early and the gaseous blowing agent, $CO_2$, escapes substantially unused. The poor elasticity also rapidly results in cracks in the material, from which the gaseous blowing agent likewise flows away unused.

BRIEF DESCRIPTION OF THE INVENTION

In the preferred embodiment, inorganic sintered foams are produced by foaming aqueous slips by a method in which the flow properties of the material change during foaming in such a way that the open pore structure is stabilized. Polymeric assistants are crosslinked during foaming. During foaming, it is possible to evaporate so much water that the cell walls are stabilized and no longer collapse, although the stabilizing pressure difference is absent on opening of the cells. This application also states that it is possible to use steam as a gaseous blowing agent. During foaming at above 100° C., the pressure is let down against atmospheric pressure, the material foaming. At the same time, some of the water evaporates and, owing to the water loss, the viscosity greatly increases and, owing to its flow limit, the foamed material no longer undergoes deformation.

Another preferred embodiment of the present invention is one in which the foaming process is carried out continuously but with the use of blowing agents, such as carbon dioxide. There, the slip material is completely premixed and carbon dioxide is evolved as a blowing agent in an extruder by heating to 60–100° C.

The present invention therefore relates to porous bodies of inorganic foams and a process for their preparation. The present invention provides a process for producing open-celled inorganic sintered foam products which comprises the following process steps:

a. A starting slip or slip material comprising sinterable inorganic powder, a vaporizable fluid material which makes the slip material capable of flow and a material forming foaming gas is converted in a foaming step into a foam product with liberation of the foaming gas. The material forming a foaming gas here encompasses both the dissolved (usually under pressure) foaming gas itself and also materials which give off a gas, in particular water vapor or $CO_2$, at low temperatures, in particular at temperatures below 200° C. The fluid material and the material forming a foaming gas can be identical. In particular, water can be used. In this step, an open-celled foam is preferably produced.

b. In a next step, this foamed product is then subjected to a treatment which essentially makes the slip material incapable of flow. These two steps a, and b, can also proceed essentially simultaneously. In steps a. and b. of this process the inorganic powder remains far below its melting point or decomposition point or sintering temperature. Thus, in particular, no foaming of liquid or molten metal occurs.

c. The material remaining from the fluid material and any further material is then removed from the intermediate body to form the green foam body.

d. Finally, the green foam body, if appropriate after an intermediate treatment, is sintered to form an open-celled inorganic sintered foam product. A possible intermediate treatment step is, in particular, a reduction to produce the pure metals from oxides. However, it is also possible to oxidize metal powder particles in a mixture of oxide and metal powders to form especially finely divided metal oxides which accumulate at the surface of the foam webs.

The novel foams or foam elements are open-cell, have a narrow cell size distribution, preferably 0.1–2 mm, and a pore fraction of, in particular, more than 70% of the volume.

Preferred foams are those which contain no silicate phases, phosphates or alkali metals interfering with the applications, a high mechanical stability, contain not more than about 10% by weight of organic assistants in the green state and already have open pores in the foamed green state in order to avoid tedious drying or pyrolysis of organic assistants. The combination of these requirements is not met by the prior art processes. However, it is desirable, for example, for the economical production of column packings in separation processes in the chemical industry or for the provision of carriers for a very wide range of heterogeneously catalyzed chemical reactions. Monolithic packings having diameters of up to half a meter and a height of several decimeters are also desirable for this purpose. On the other hand, granules having a dimension of 2–30 mm are also required for such applications. The above amounts and dimensions characterize preferred embodiments of product and process according to the invention.

According to preferred embodiment of the invention, a process for the preparation of open-cell inorganic sintered foam products is provided. This process is distinguished by the following stages:

a. First, a starting slip or slip of sinterable inorganic powder, a vaporizable fluid material which renders the slip flowable and a material forming expansion gas are converted into a foamed product in a foaming stage, preferably a continuous one, with liberation of the expansion gas. The material forming expansion gas should comprise the expansion gas itself, which is dissolved (generally under pressure), as well as those materials which release a gas, in particular steam or $CO_2$, at low temperatures, in particular at below 200° C. The fluid material and the material forming expansion gas may be identical. In particular, water may be used. In this stage, an open-cell foam is preferably produced.

b. In a subsequent stage, this foamed product is then subjected to a treatment which substantially eliminates the flowability of the slip.

These two steps a. and b. may also take place essentially simultaneously. In stages a. and b. of this process, the inorganic powder remains well below its melting point or decomposition point or sintering temperature. In particular, there is therefore no foaming of fluid or molten metal.

c. The material remaining from the fluid material as well as any further material is then removed from the intermediate element with formation of a green foam element.

d. Finally, the green foam element is sintered, if necessary after an intermediate treatment, to give an open-cell inorganic sintered foam product. A particularly suitable intermediate treatment stage is a reduction in order to prepare the pure metals from oxides. However, it is also possible to convert a mixture of oxide and metal powder into particularly finely divided metal oxides, which accumulate at the surface of the foam webs, by oxidation of the metal powder fraction.

In the above process, water is particularly preferably used as the fluid material. For the purposes of the present invention, however, it is also possible to use water-soluble or water-dispersible solvents having boiling points below 100° C., in particular lower alkanols, such as methanol or ethanol, ketones, such as acetone, and low-boiling hydrocarbons, for example pentane, hexane or cyclohexane. Water alone is preferred.

In an embodiment of the novel process, the slip in the flowable state is foamed in stage a. with the aid of a blowing agent contained therein and/or of a blowing agent precursor contained therein. Particularly suitable blowing agents or blowing agent precursors of this type are carbon dioxde and steam (in particular steam at 4–8 bar) as well as appropriate compounds which release $H_2O$ or $CO_2$.

According to the invention, it is preferable to reduce the flowability of the slip after or during the foaming stage by increasing the degree of filling, based on volume, of the slip, in particular by 0.5–5%, preferably 1–3%. The degree of filling, based on volume, of the slip denotes the percentage by volume of the starting slip which is occupied by the inorganic powder particles. It is determined from the ratio of the volume of the inorganic powder particles (weight divided by density) to the total volume of the slip.

The above data on the preferred range for increasing the degree of filling, based on volume, by 0.5–5%, preferably 1–3%, is relative to percentage points of the slip. At a degree of filling, based on volume, of the slip of, for example, 47%, said degree of filling is increased, preferably, to 48–50%.

In the novel process for the preparation of open-cell inorganic sintered foam products, it is preferable to use a slip which contains liquid water which, to eliminate the flowability of the slip, is at least partly converted into steam which foams the slip. In one procedure of the invention, this vaporization of the liquid water is effected by microwave heating of infrared heating or a reduction in the ambient pressure of a starting slip preheated to 100° C.

The organic powder materials which are particularly suitable for the novel process are one or more of the following products:

Metal powders

Mineral powders

Ceramic powders

Metal carbide powders

Metal nitride powders

Slips which are particularly suitable for the novel process having the following composition:

a. Inorganic powder, including sintering assistant 30–60 parts by volume b. Vaporizable liquid, in particular water 30–60 parts by volume c. Dispersant 0–4, preferably 0.5–3, parts by volume d. Binder 2–20, preferably 4–15, parts by volume e. Blowing agent 0–4, preferably 1–3, parts by volume f. Blowing agent precursors 0–8, preferably 2–6, parts by volume According to the invention, it is preferable to subject the slip to a shaping procedure before or during the foaming stage. In particular, the slip can be extruded, foaming being effected directly after extrusion. A further method, which is preferred according to the invention whenever defined applications of porous material are desired, comprises introducing the slip into a mold and foaming it therein. In particular, cylindrical or sheet-like sintered foam products can be produced in this manner. According to the invention, it is preferable to produce the sintered foam element in a continuous process. In this process, sinterable, inorganic powder, a fluid vaporizable material which renders this flowable and, if required, a material forming a gaseous blowing agent are mixed with one another to give a starting mixture and the latter is subjected to continuous positive conveying. The positively conveyed starting mixture is subjected continuously to a pressure generation stage so that the vaporizable material vaporizes at least partially, but essentially without volume change and with a pressure increase in the starting mixture, and a starting mixture under pressure is thus formed, the starting mixture under pressure is expanded continuously into a volume under lower pressure than that of the starting mixture under pressure, with formation of a starting mixture foam, the starting mixture foam is converted into a green foam element and the grean foam element is sintered with formation of the sintered foam product. The starting mixture under pressure is preferably foamed immediately after emerging from a die, against atmospheric pressure.

Preferred embodiments of this continuous process are distinguished by one or more of the following features:

a) the positive conveying is effected in a continuous extruder, preferably a twin-screw extruder;

b) inorganic powder and the other materials are fed to the positive conveyor, separately from one another, in such a way that the mixing thereof to give a slip is carried out only in the positive conveyor;

c) a dispersant, preferably an ionic or steric dispersant, is introduced into the starting mixture;

d) a binder, in particular an organic binder, preferably a water-soluble polymer, is introduced into the starting mixture;

e) water is used as vaporizable material, the procedure is preferably carried out without additional blowing agent and the positively conveyed mixture is heated to a temperature of from 100 to 200° C. to evaporate at least some of the water, the temperature preferably being increased in more than one stage and the cells of the resulting starting mixture foam being stabilized by the removal of water which takes place as a result of the vaporization;

f) inorganic powder and a mixture of water, dispersant and binder are fed separately from one another into the positive conveyor;

g) the starting mixture in the positive conveyor is heated in a heating zone of the positive conveyor;

h) the starting mixture under pressure is expanded with foaming;

i) the starting mixture foam is converted into the green foam element by drying;

j) the green foam element is brought to the sintering temperature of the inorganic powder material at a heating rate of from 2 to 20° C./min, and k) in order to shut down the process, first the heating of the positively conveyed material is turned down so that essentially no more vaporization of the vaporizable material in the positive conveyor takes place and then the positive conveyor is emptied.

Slips which are particularly suitable for the continuous process preferred according to the invention have the following composition:

a. Inorganic powder, including sintering assistant 30–60 parts by volume
b. Vaporizable liquid, in particular water 30–60 parts by volume
c. Dispersant 0–4, preferably 0.5–3, parts by volume
d. Binder 2–20, preferably 4–15, parts by volume A porous element comprising inorganic particles bonded to one another and having a size of from 0.1 to 50 $\mu$m, a pore volume of from 50 to 95%, a surface area of from 0.01 to 1 $m^2$/g and irregular pores is furthermore claimed according to the invention. This porous element is distinguished by close-sintered webs of irregular length having length differences of from 1:1.5 to 1:100, a ratio of web diameter to particle diameter of from 2 to 10,000, preferably from 5 to 5,000.

Figure 1A:
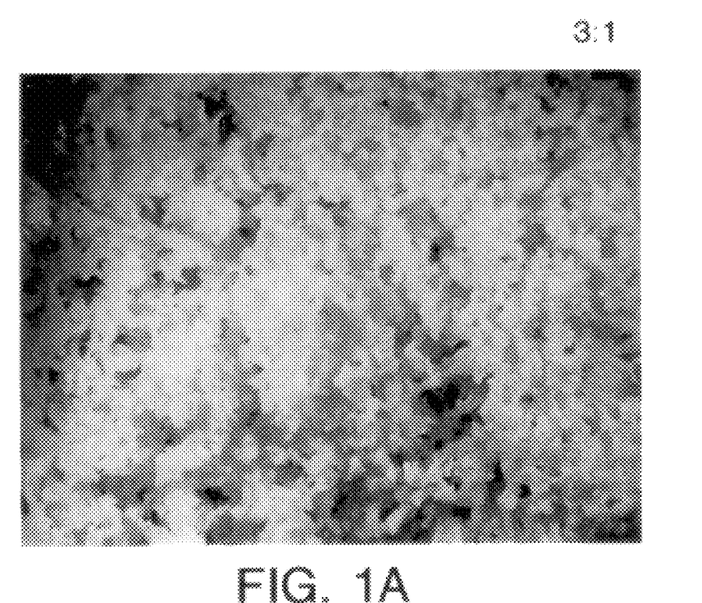
Figure 1B:
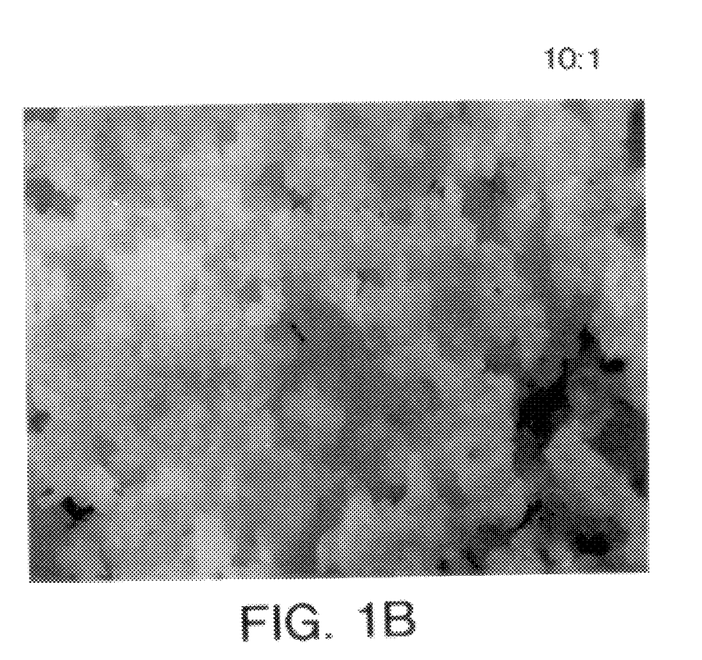

The preferred porous element has a structure as shown in cross-section in the attached FIG. 1, which is a copy of views of the novel porous element magnified 3:1 and 10:1.

The novel porous element preferably consists of the inorganic materials defined above. Particularly advantageously, this porous element is also provided with catalytically active material or material which can be converted into catalytically active material, in particular with one or more noble metals. In this case, such a porous element is a catalyst (which may have to be further activated). The metals or noble metals are present in an amount of 0.1–5% by weight, based on the total porous element. Particularly suitable catalytically active materials for such porous elements are platinum, palladium, cobalt, nickel, iron and copper.

The abovementioned combination of requirements is met, according to the invention, preferably by dispersing an inorganic powder a in water, the volume fraction of the inorganic powder in the slip thus prepared corresponding to at least the degree of filling, based on volume and stated below, with the use of a dispersant c, adding a binder d and, unless steam is used as the blowing agent, blowing agent e which generates a gaseous blowing agent, or a blowing agent precursor f. The slip thus obtained is foamed by the action of the gaseous blowing agent, which is let down against atmospheric pressure, the open-cell foam is, if necessary, stabilized by vaporization of a small amount of water under the action of heat, the green foam element is then dried, the organic additives are removed during heating to the adequate sintering temperature for the material and the foam element is then sintered, close webs being formed and the foam element itself shrinking by the amount by volume previously occupied by water and additives.

In order to achieve the totality of the objects according to the invention, it is preferable if the inorganic slip comprises inorganic sinterable powder in a volume fraction or degree of filling for which the following is roughly applicable: DF≧30: (1+0.1×BET)+20. In this case, in particular, webs of high mechanical strength are obtained. Here, BET is the BET surface area of the powder in $m^2$/g and DF is the degree of filling in % by volume. The relationship is applicable to powders having BET surface areas of from 0.1 to 300 $m^2$/g. The degree of filling is thus at least about 40% by volume in the case of ceramic powders having BET surface areas of about 5 $m^2$/g, whereas it is at least about 49% by volume in the case of metal powders having BET surface areas of about 0.5 $m^2$/g.

It is furthermore preferred if the viscosity of the slip can be adjusted, by means of the volume fraction of inorganic sinterable powder and by means of the binder, so that said slip just flows under its own weight and the flow limit is reached at a water loss of 0.5–5, in particular 1–3, % by volume. Thus, the foam element can be readily stabilized, ie. prevented from collapsing, after the foaming procedure. This advantage is present in the case of slips having a high degree of filling, based on volume, because the flow limit is reached by a small increase in the degree of filling at a high degree of filling, based on volume.

The high degree of filling, based on volume, provides a further possibility which is utilized in the invention, ie. making use of the structural viscosity behavior of the flowable materials having a high content of filler particles. At high shear rates, which are advantageously used for mixing of the novel slips and for introduction into a mold, the viscosity of the slips is low. It increases after the end of shearing, with the result that the foam stability is also increased.

The inorganic powder a serves for building up the webs of the open-cell inorganic foam. These are ceramic materials, preferably selected from the group consisting of alumina, zirconium oxide, partially or completely stabilized with magnesium oxide or yttrium oxide, and silicon carbide, silicon nitride, including its conventional sintering assistants, such as alumina and yttrium oxide, cordierite, mullite, tungsten carbide, titanium carbide, tantalum carbide, vanadium carbide, titanium nitride, tantalum nitride and metal powders, preferably selected from the group consisting of iron, cobalt, nickel, copper, silver, titanium, steel powders or alloy powders of iron-, nickel- or cobalt-based alloys. Ceramic powders containing other materials, for example metals, may also be used.

The ceramic powders may also be mixed with one another. Carbides, nitrides or metal powders may also be mixed with one another as desired.

The mean particle sizes of the preferably used ceramic powders are 0.1–10 $\mu$m, in particular 0.3–2 $\mu$m; the particles sizes of the metal powders are preferably 1–50 $\mu$m, in particular 2–20 $\mu$m.

Either ionic or steric dispersants are used as dispersant c. Ionic dispersants, such as nitric acid or formic acid, impart a surface charge which is of the same sign and therefore repulsive to the powders to be dispersed, and the individual particles can therefore readily slide past one another. They reduce the viscosity and thus permit an advantageously high degree of filling. Acids are not suitable as dispersants for non-noble metals because they reduce the flowability of the slips by oxide or salt formation at the surface of the metal powders. Steric dispersants have a surfactant structure; by means of an anchor group, they are attracted to the powders to be dispersed and thus likewise result in low viscosities and high degrees of filling. Such dispersants are, for example, tetramethylammonium oleate and tetrabutylammonium oleate. 0.5–3%, based on the powder material, are sufficient for dispersing ceramic powders, while 0.01–0.5%, based on the powder material, is preferred for dispersing the larger metal powders. The data are based on the total weight of the slip.

The binder d is preferably used for mechanical strengthening of the material after the foaming process and, if required, for increasing the extensibility during foaming. Dispersant and binder act against one another. The smaller the amount of dispersant used, the less binder is employed. The amount of solid binder is 1–6%, based on the inorganic powder used. Preferably used binders are water-soluble polymers, such as polyvinyl alcohol, starch, methylated starch, alginates, hydroxymethylcellulose, polyacrylic acid, polyacrylamide, polyethyleneimine, polyvinylamine, polyvinylformamide or polyvinylpyrrolidone. Another class of binders comprises aqueous polymer dispersions based on styrene/butadiene copolymers or acrylates. On evaporation of the water, they form films which hold together the inorganic powder particles. If permitted by the web-forming material, aluminum hydroxide may be used as the inorganic binder.

Steam is preferably used as the blowing agent. If novel slips are foamed against atmospheric pressure, some of the water evaporates; owing to the water loss, the viscosity increases considerably and, owing to its flow limit, the foamed material no longer undergoes deformation. However, it is also possible to preheat the slip to a temperature below 100° C. and then to foam it by evaporating the water by reducing the ambient pressure.

Preferably used blowing agents e are ammonium carbonate, ammonium carbamate or ammonium bicarbonate, which eliminate carbon dioxide and ammonia at above 50° C., it being mainly the carbon dioxide which acts as a blowing agent, owing to its low water solubility. The ammonium carbonates are used in amounts of from 0.5 to 2%, based on the mass of the inorganic powder. However, it is also possible to use carbon dioxide directly as a blowing agent, for which purpose the slip is saturated with carbon dioxide under pressure at room temperature and then let down against atmospheric pressure.

Precursors of blowing agents E form the blowing gas only as a result of chemical reaction. Thus, addition of pulverulent water-insoluble phthalic anhydride results in slow hydrolysis at room temperature to phthalic acid. This then liberates carbon dioxide as blowing agent from the blowing agents D, more slowly than on heating or with the addition of free acid. Here, for example, carbon dioxide is liberated more rapidly from ammonium carbonate or ammonium hydrogen carbonate than from ammonium carbamate. The combination ammonium carbamate/phthalic anhydride thus leads to slow foaming. Further carboxylic anhydrides which can be used in this way are pyromellitic dianhydride or maleic dianhydride. Among the above carboxylic anhydrides, maleic anhydride is the most reactive and thus gives rapid foaming.

Owing to the slow, controlled blowing of the foam, the incipient fracture of cells or the formation of cracks is avoided and the blowing gas is better utilized, thus giving higher proportions by volume of pores.

The foaming rate can be adjusted by using carboxylic anhydride powders of various particle sizes. The larger the particle size, the lower is the hydrolysis rate. The smaller the carboxylic anhydride particle, the larger is its specific surface area, the hydrolysis rate and the foaming rate. Optimum particle sizes are in the range from 1 to 200 $\mu$m, preferably from 10 to 100 $\mu$m.

If ammonium hydrogen carbonate is used as blowing agent the ratio of acid equivalents to blowing agent is set to from 1:0.8 to 1:1.2; blowing agent and acid former are preferably mixed in a stoichiometric ratio. This way of forming the blowing gas leads particularly economically to large, high-quality, inorganic foam moldings.

The materials to be employed are matched to one another so that the desired behavior is achieved. Ionic dispersion based on an acid is preferably combined with polymer dispersions as binder which do not flocculate in acid medium.

The following variants can be carried out advantageously:

a. Ionic dispersion of ceramic slip materials or of slip materials comprising metal powders which are more positive than hydrogen, using water-soluble polymers as binder. They can be foamed by stirring in carbon dioxide in a pressure vessel at room temperature and expansion at $CO_2$ pressures of 3–10 bar against atmospheric pressure or without using a pressure vessel by stirring in ammonium (hydrogen) carbonate. If the foam is gently heated, for example by means of an IR radiator, sufficient water evaporates for the foam to remain without collapsing.

After heating the slip materials in a pressure vessel to 120–160° C., the slip materials can be foamed against atmospheric pressure under the intrinsic vapor pressure of water, with sufficient water evaporating to prevent collapse of the foam. Granulated foams are produced by rapid opening and closing of the discharge valve; foamed moldings are produced by batchwise injection into a slightly perforated mold.

b. Steric dispersion of ceramic slip materials using water-soluble polymers or polymer dispersions as binder and ammonium (hydrogen) carbonate as blowing agent. They can be heated in molds in microwave appliances, with foaming occurring within a few seconds, accompanied by vaporization of water. Foaming, vaporization of water and thus solidification occur virtually simultaneously. Mechanically stable moldings are obtained. This variant cannot be employed for metal foams because of their electrical conductivity. Nevertheless, it is possible to use this route for producing metal foams from the catalytically important metals such as Fe, Ni, Co, Cu, Ag by initially using the corresponding oxide powders or their mixtures, foaming the slip materials in a microwave field and, after drying and pyrolysis, sintering under hydrogen to reduce the oxides and give metal foams.

c. Steric dispersion of ceramic or metallic slip materials using water soluble polymers or polymer dispersions as binder. They can be foamed by stirring in carbon dioxide in a pressure vessel at room temperature and expansion at $CO_2$ pressures of 2–10 bar against atmospheric pressure. Heating the foam, eg. by means of an IR radiator, directly after extrusion causes vaporization of sufficient water for the flow limit of the foamed slip material to be reached.

d. Steric dispersion of ceramic or metal slip materials using high molecular weight water-soluble polymers as binder for increasing the toughness/elasticity. The slip materials contain ammonium carbonate, ammonium carbamate or ammonium hydrogen carbonate. Shortly before foaming, carboxylic anhydride powder is stirred in and the composition is then foamed in a mold or as extrudate after extrusion. Particular preference is given to the variants b. and d. because they make possible the production of large foam parts and can be carried out without expensive pressure equipment.

The slip materials for the foams of the present invention are prepared in conventional mixers or kneaders without additional complicated apparatus. The optimum viscosity is most simply set visually. Powder, dispersant or water is in each case added to the formulation until the slip material is still just capable of flowing under its own weight. The proportion by volume of solids at which the flow limit is reached differs depending on the powder particle size or powder surface area. In the case of the comparatively low particle sizes of ceramic powders of from 0.3 to 2 µm, the flow limit is reached at 40–50% by volume; in the case of the coarser metal powders having a mean particle diameter of 2–20 µm, the flow limit is reached at 50–60% by volume.

The manufacture of the open-celled inorganic foams of the present invention can be carried out either batchwise or continuously. In the case of batchwise manufacture, foaming is carried out after preparation of the mixture, if desired in a mold. To produce granulated materials, the mixture of slip material may be divided up prior to the foaming process and the granules are then foamed to give irregularly shaped or spherical granules. The foamed part is dried at 100–130° C. in a stream of air, then heated at a rate of from 3 to 5° C./min to 350–600° C. To completely remove the organic constituents, the composition is left for 1 hour at 350–600° C. and then heated further for the purposes of the actual sintering process: Fe, Co, Ni, for example, to 800–1200° C. under hydrogen, Cu to 700–950° C., likewise under hydrogen, zirconium oxide under air to 1450° C., aluminum oxide under air to 1650° C. or silicon carbide under argon to 2250° C.

For continuous manufacture according to variant b., the slip material is prepared batchwise but then extruded by means of a continuous screw extruder. After leaving the dies, the extrudates are conveyed on a substrate on a conveyor belt through a microwave field, foamed there and further dried in a downstream drying section. It is also possible to employ a screw extruder whose barrel is unheated in the vicinity of the intake, but is heated to 60–100° C. in the vicinity of the die. In this way, the slip material is compacted in the vicinity of the intake, the material is conveyed and the screw extruder is sealed in a gastight manner right to the intake. In the hot zones in the vicinity of the die, carbon dioxide is generated by the thermal decomposition of the blowing agent or the blowing agent combination, thus foaming the composition before or after passage through the die. Pyrolysis and sintering follow in further process sections. The extrudate can be broken up into granules directly after extrusion.

In the case of continuous manufacture according to variant d., the procedure is as for b. except that the carboxylic anhydride as acid former is metered in only after the composition is drawn into the screw extruder. If desired, the screw extruder may also have a mixing section for improving the distribution of the acid former. The microwave heating can be omitted.

Figure 2:
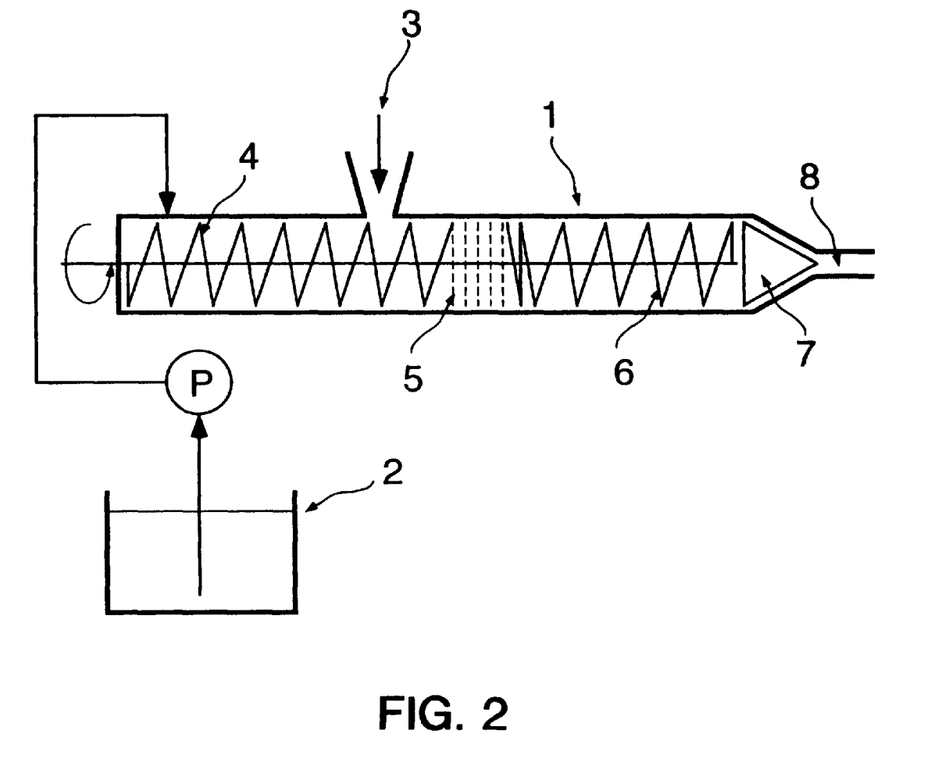

A preferred technical embodiment of the continuous process is described below with reference to FIG. 2:

The continuous process for the preparation of the novel open-cell inorganic sintered foams is preferably carried out using a twin-screw extruder 1 which can be equipped in a modular manner with various conveying and kneading elements. Such extruders are widely used in plastics processing technology for compounding thermoplastic materials. The twin screw arrangement has the advantage over single-screw extruders that the material to be conveyed can be transported against high pressures and, owing to the positive conveying characteristic, the material cannot wind around the screw with stoppage of conveying.

The aqueous solution of the assistants, such as dispersant and binder, is initially taken in container 2. The container 2 stands on an electronic balance (not shown) whose output signal controls the pump P in order to pump an exactly measured mass flow to the conveyor screws 4 (only one of these is shown) at the extruder feed.

At the point 3, the inorganic powder or the inorganic powder mixture is metered in via a continuous metering apparatus regulated on the basis of mass flow. At the point 5, two slip components are thoroughly mixed and combined to form the actual slip. These process steps are carried out at room temperature or slightly elevated temperatures, but in any case below the boiling point of water (100° C.). At the point 6, the extruder is again equipped with conveying elements; the barrel is heated in the region of point 6 so that the slip material assumes temperatures of from 100 to 200° C., preferably from 110 to 150° C.

The material in this part of the extruder is under the steam pressure which develops according to the vapor pressure curve of water. Because the two extruder screws have a structure forming closed chambers, there is no significant increase in volume. By means of the displacer 7, the material passes through the die 8 into a receiving volume, in order to expand there, for example against atmospheric pressure. The displacer is preferably used in order to maintain the pressure difference between the interior of the extruder and the receiver pressure (eg. atmospheric pressure).

It has proven advantageous to introduce an adjustable constrictor in the form of a valve into the die 8 in order to have a further regulating facility for precise regulation.

The separate metering of inorganic powder and the water/assistants combination makes it possible to regulate the viscosity of the slip during the process to optimum levels or also to regulate it according to the variation of the foam temperature (corresponding to the vapor pressure).

This adjustment is carried out after visual assessment of the foamed material. It is very advantageous that the residence time in the extruder is preferably only from about 2 to 5 minutes, with the result that the dead time for the adjustment is low.

When the extruder is started up, all heating zones initially remain unheated. The extruder is allowed to rotate and the aqueous solution of assistants is first metered in. Once this has reached zone 3, powder metering is begun. The flows are regulated so that a soft, semisolid extrudate emerges from the die. After a stable conveyed stream is obtained, heating is carried out in zone 6 in order to develop the water vapor pressure. The heating temperature depends on the porosity to be achieved. At the stated temperatures, the extrudate expands after emerging from the die and can be cut off (cut to length), or it breaks off in lengths of from 3 to 50 mm.

Preferably, conveying is not interrupted during the process, in order to prevent water from evaporating inside the extruder itself and the viscosity increasing to such an extent that the extruder becomes blocked.

The still moist foam granules thus produced are dried in air at from 110 to 130° C., calcined and then sintered at temperatures adequate for the material.

DETAILED DESCRIPTION OF THE INVENTION

EXAMPLES

Example 1

A twin-screw extruder from Werner & Pfleiderer of the type ZSK 25 is used; the length of the process section without die head is 0.825 m and the ratio of length to diameter is 33.

At the extruder feed, 880 g/h of a solution of 576 g of demineralized water, 144 g of polyvinylpyrrolidone (Luviskol® K 90, BASF) and 160 g of a 25% strength by weight aqueous formulation of tetramethylammonium oleate were metered in by means of a mass-regulated gear pump. At the point 3, about 300 mm downstream of the point at which the solution was metered in, 3250 g/h of an alumina powder (CT 3000 from Alcoa) having a particle diameter of about 0.9 μm were metered in. The components were mixed by means of a roughly 100 mm long combination of kneading blocks to give the slip and the mixture was discharged through a die of 2.5 mm diameter. The process section of the extruder was divided into seven heating zones of equal length. After constant conveying had been reached, the 5th, 6th and 7th zones, which were arranged downstream of the mixing section, were heated to 105, 110 and 125° C. (heating medium temperature), respectively. The extrudate emerging from the die then expanded in the desired manner. The extrudate pieces were collected, dried for 12 hours at 130° C., then transferred to a sintering furnace and heated at a heating rate of 5° C./min from room temperature to 300° C., left under air for 1 hour at 300° C., then heated at 5° C./min to 600° C., left for 1 hour at 600° C., then heated at 5° C./min to 1650° C. and left for 3 hours at 1650° C., and the furnace was then allowed to cool in an uncontrolled manner.

Stable, open-pore granules having a diameter of about 2.5 mm and a length of from 3 to 10 mm were obtained. Compared with the extruded granules, they had shrunk by about 20% in the linear dimensions. The pore sizes were from 0.1 to 5 mm and the pore fraction was about 75%.

Example 2

4 g of an aqueous solution consisting of 1 part of tetrabutylammonium oleate and 3 parts of water were weighed into a glass beaker having a diameter of about 7 cm and a height of about 9 cm. 7 g of a commercially available polyacrylic ester dispersion having a solids content of about 50% (Acronal® S 360 D from BASF AG) were then added, together with 2 g of ammonium hydrogen carbonate. The mixture was made up to 22 ml using distilled water. It was then mixed using a high-speed stirrer and the ammonium hydrogen carbonate was thus dissolved. 80 g of an α-aluminum oxide powder having a mean particle size of around 0.9 μm and a density of around 4.0 g/cm$^3$ (Alcoa® CT 300) were then added at room temperature while stirring; 80% of this amount was added over a period of about 5 minutes, a further 10% was added over a further period of 5 minutes and the remaining 10% was added over a period of 10 minutes, and the mixture was then stirred for a further 10 minutes to destroy powder agglomerates. Removal of the stirrer left a flowable mixture. The glass beaker together with contents was placed in a household microwave oven having a power of 500W and exposed to a microwave field for 30 seconds in the middle of the turntable. The slip material was foamed from an initial volume of about 42 ml to a volume of about 200 ml, viz. to five times the initial volume. This gave a mechanically stable, somewhat elastic cylindrical foam body. The proportion by volume of α-aluminum oxide powder, based on the total foam volume, was about 10%. The foam body was dried for 2 hours at 120° C. and then transferred to a sintering furnace. There it was heated in air at 3° C./min from 120° C. to 500° C., held for 1 hour at 500° C., then heated at 3° C./min to 1650° C., held for 2 hours at 1650° C. and the furnace was then cooled at 3° C./min to 1000° C. and subsequently switched off. Compared with the unsintered foam body, the sintered foam body had undergone a shrinkage in its linear dimensions of about 20%. It was mechanically very stable and comprised open pores having pore widths of from 0.2 to 0.5 mm.

Example 3

Using a method similar to Example 2, 4 g of an aqueous 25% strength solution of tetrabutylammonium oleate, 7 g of polyacrylic ester dispersion and 2 g of ammonium hydrogen carbonate were weighed into the glass beaker and made up to 22 ml using distilled water. The mixture was homogenized and the ammonium hydrogen carbonate was thus dissolved. While mixing with the high-speed stirrer, 122 g of cobalt oxide $Co_3O_4$ having a particle size of around 1 μm and a density of 6.07 g/cm$^3$ were added over a period of 30 minutes, using a method similar to Example 1, and then stirred for a further 10 minutes. Removal of the stirrer left a viscous, flowable mixture. The glass beaker together with contents was exposed to a microwave field for 20 seconds in the microwave oven. This foamed the slip material from an initial volume of about 40 ml to a final volume of about 220 ml, viz. by a factor of 4.5. The open-pored, still moist foam was removed from the glass beaker serving as mold and dried for 2 hours at 120° C. in a convection drying oven. It was then transferred to a pyrolysis furnace and heated in air at 3° C./min from 120° C. to 600° C., then held for 2 hours at 600° C. The furnace was then cooled, the cobalt oxide foam freed of the organic constituents was taken out and transferred to a metal sintering furnace. There, the foam body was heated in a hydrogen atmosphere at atmospheric pressure at 3° C./min to 1150° C., held for 2 hours at 1150° C. and the furnace was then cooled under hydrogen. The hydrogen atmosphere was then replaced by nitrogen and the foam body was taken out.

Because cobalt becomes coated on exposure to air with a relatively dense, thin, passivating oxide layer, no protective measures are necessary to prevent burning of the foam. However, iron foams produced in a similar way have to be stored in nitrogen or argon, because they can burn in air.

Compared with the unsintered cobalt oxide foam, the metallic cobalt foam has undergone shrinkage in its linear dimensions by about 36% as a result of sintering shrinkage and also the volume reduction in going from cobalt oxide to metallic cobalt. The cobalt foam is mechanically extremely stable and comprises open pores having pore widths of from 0.2 to 0.8 mm.

Example 4

5 g of an aqueous gel consisting of 1 part of tetramethylammonium oleate and 3 parts of water were weighed into a glass beaker having a diameter of about 7 cm and a height of about 9 cm. 22 g of a 20% strength aqueous solution of a high molecular weight polyvinylpyrrolidone (Luviskol® K 90, BASF AG) and 2 g of ammonium carbonate were then added. The mixture was stirred and the ammonium carbonate was thus dissolved. 64 g of a silicon carbide powder having a mean particle size of around 0.7 μm, a density of 3.2 g/cm$^3$ and a content of 0.2% of boron carbide as sintering aid were then added to the above mixture using high-speed stirring; 80% were added over 5 minutes, a further 10% over 5 minutes, the remaining 10% over 15 minutes, and the mixture was stirred further for 20 minutes.

After mixing, a flowable slip material was obtained. 2 g of a phthalic anhydride powder which had been brought to a particle size of 20–50 μm by milling the commercial flake material and screening were stirred into this slip material over a period of about 30 seconds. The foaming process commenced after about 2 minutes, with the slip material expanding in the glass beaker. After about 3 minutes the foam stopped expanding: it had then expanded to four times its initial volume. After partial drying, the open-pored foam was taken out, dried for 2 hours at 130° C. in a convection oven and the organic constituents were then removed in a pyrolysis furnace by heating in air at 2° C./min to 600° C.

and holding for 1 hour at 600° C. After cooling the pyrolysis furnace, the foam body was transferred into a graphite sintering furnace, heated in argon at 5° C./min and sintered for 2 hours at 2150° C. This gave a stable foam body of silicon carbide which, compared with the unsintered foam body, had undergone shrinkage in its linear dimensions by about 21% and comprised open pores having pore widths of from 0.5 to 1 mm.

Example 5

1 g of an aqueous gel of 25% strength tetramethylammonium oleate, 19 g of a 20% strength aqueous solution of a high molecular weight polyvinylpyrrolidone (Luviskol® K 90, BASF AG) and 2 g of ammonium hydrogen carbonate were placed in a glass beaker having a diameter of about 7 cm and a height of about 9 cm. The mixture was stirred and the ammonium hydrogen carbonate was thus dissolved. 168.7 g of an iron powder having a density of 7.67 g/cm$^3$ and a particle size of around 3 μm (carbonyl iron powder CEP, BASF AG) were stirred into the above mixture over a period of 15 minutes using high-stirring. After stirring for a further 10 minutes, a flowable, viscous mixture was obtained. 2 g of a phthalic anhydride powder having a particle size in the range 20–50 μm were stirred into this mixture over a period of about 30 seconds. Foaming commenced after about 1.5 minutes. The foaming process was complete after 2 minutes, the volume had increased to six times the initial volume.

The open-pored foam body obtained was dried under nitrogen for 2 hours at 130° C. (ignition occurs in air!). The dried foam body was transferred into a sintering furnace flushed with nitrogen. During heating at 2° C./min to 600° C., the nitrogen atmosphere in the sintering furnace was replaced by hydrogen. After a hold time of 2 hours at 600° C., heating was continued at 4° C./min to 1200° C., the temperature was held for 1 hour at 1200° C. and the furnace was then cooled. After cooling, the hydrogen was replaced by nitrogen and the foam body was then transferred to a container filled with argon in order to prevent ignition. This gave a mechanically very stable open-pored iron foam which, compared with the unsintered foam body, had undergone shrinkage in its linear dimensions by about 16%, and had pore widths of from 0.1 to 0.8 mm.

We claim:

1. A process for the preparation of an open-cell, inorganic sintered foam product, wherein
    a) sinterable, inorganic powder, a fluid vaporizable material which renders this flowable and, if required, a material forming a blowing gas are mixed with one another to give a slip and the slip is subjected to continuous positive conveying,
    b) the positively conveyed slip is subjected continuously to a pressure generation stage so that the vaporizable material vaporizes at least partially, but essentially without volume change and with a pressure increase in the slip, and a slip under pressure is thus formed,
    c) the slip under pressure is expanded continuously into a volume under lower pressure than that of the slip pressure, with formation of a slip foam,
    d) the slip foam is converted into a green foam element and
    e) the green foam element is sintered to form the sintered foam product.

2. A process as claimed in claim 1, wherein the slip comprises as material forming blowing gas a blowing agent and/or a blowing agent precursor and the slip material is foamed by this material forming blowing gas.

3. A process as claimed in claim 2, wherein the blowing agent is $H_2O$ or $CO_2$.

4. The process as claimed in claim 1, which comprises one or more of the following features:
    a) the positive conveying is effected in a continuous extruder;
    b) inorganic powder and the other materials are fed to the positive conveyor, separately from one another, in such a way that the mixing thereof to give a slip is carried out only in the positive conveyor;
    c) a dispersant, preferably an ionic or stearic dispersant, is introduced into the slip;
    d) a binder is introduced into the slip;
    e) water is used as vaporizable material, the procedure is carried out without additional blowing agent and the positively conveyed mixture is heated to a temperature of from 100 to 200° C. to evaporate at least some of the water, the temperature preferable being increased in more than one stage and the cells of the resulting slip foam being stabilized by the removal of water which takes place as a result of the vaporization;
    f) inorganic powder and a mixture of water, dispersant and binder are fed separately from one another into the positive conveyor;
    g) the slip in the positive conveyor is heated in a heating zone of the positive conveyor;
    h) the slip under pressure is expanded with foaming;
    I) the slip foam is converted into the green foam element by drying;
    j) the green foam element is brought to a sintering temperature of the inorganic powder material at a heating rate of from 2 to 20° C./min.; and
    k) in order to shut down the process, first the heating of the positively conveyed material is turned down so that essentially no more vaporization of the vaporizable material in the positive conveyor takes place and then the positive conveyor is emptied.

5. A process as claimed in claim 4 wherein catalytically active material or material capable of being converted into such is applied to the inner and/or outer surface of the open cells.

6. A process as claimed in claim 1 wherein the slip comprises liquid water which, to make the slip incapable of flow, is converted at least partially into the gas which foams the slip, by means of microwave heating and/or IR heating.

7. A process as claimed in claim 1, wherein the inorganic powder is selected from the group consisting of metal powders, mineral powders and ceramic powders.

8. A process as claimed in claim 1 wherein the slip consists essentially of:
    a) 30–60 parts by volume inorganic powder including sintering aid,
    b) 30–60 parts by volume water,
    c) 0.5–3 parts by volume dispersant,
    d) 4–10 parts by volume binder,
    e) 1–3 parts by volume blowing agent, and
    f) 2–6 parts by volume blowing agent precursor.

9. A process for producing an open-celled, inorganic sintered metal foam product, which comprises
   a. converting slip material comprising a metal oxide powder of a catalytically active metal and a fluid, vaporizable material, which makes this slip material capable of flow into a foamed product in a foaming step with vaporization of vaporizable material,
   b. drying the foamed product to essentially make the slip material incapable of flow and form an open-pored intermediate body, with the steps a. and b. being able to proceed essentially simultaneously,
   c. removing material remaining from the fluid material and any further material from the intermediate body by pyrolysis to form a green foam body, and
   d. sintering the green foam body under hydrogen to reduce the oxide and to form the open-celled, inorganic sintered foam product.

10. A process as defined in claim 9 wherein the catalytically active metal is a member selected from the group consisting of Fe, Ni, Co, Cu and Ag.

* * * * *